United States Patent
Laulainen et al.

(10) Patent No.: US 9,213,317 B2
(45) Date of Patent: Dec. 15, 2015

(54) METHOD AND ARRANGEMENT FOR TRANSFERRING A TIME OF DAY VALUE BETWEEN NETWORK ELEMENTS

(75) Inventors: Mikko Laulainen, Helsinki (FI); Kenneth Hann, Espoo (FI)

(73) Assignee: CORIANT OY, Espoo (FI)

( * ) Notice: Subject to any disclaimer, the term of this patent is extended or adjusted under 35 U.S.C. 154(b) by 2186 days.

(21) Appl. No.: 12/254,361

(22) Filed: Oct. 20, 2008

(65) Prior Publication Data
US 2009/0109954 A1    Apr. 30, 2009

(30) Foreign Application Priority Data
Oct. 24, 2007   (FI) ...................................... 20070800

(51) Int. Cl.
*H04J 3/06*      (2006.01)
*G04G 7/00*      (2006.01)
*H04W 56/00*     (2009.01)

(52) U.S. Cl.
CPC ............. *G04G 7/00* (2013.01); *H04W 56/0055* (2013.01); *H04W 56/0035* (2013.01)

(58) Field of Classification Search
None
See application file for complete search history.

(56) References Cited

U.S. PATENT DOCUMENTS

| | | | |
|---|---|---|---|
| 5,805,602 A | | 9/1998 | Cloutier et al. |
| 6,104,729 A | * | 8/2000 | Hellum et al. ............... 370/503 |
| 6,246,738 B1 | | 6/2001 | Acimovic et al. |
| 7,397,312 B2 | * | 7/2008 | Guilford ........................ 331/17 |
| 2006/0056403 A1 | * | 3/2006 | Pleasant et al. ............... 370/389 |
| 2007/0104228 A1 | | 5/2007 | Cohen et al. |

FOREIGN PATENT DOCUMENTS

| | | |
|---|---|---|
| WO | 03/058863 | 7/2003 |
| WO | 2005/020486 | 3/2005 |

OTHER PUBLICATIONS

Search Report dated Sep. 19, 2008, in Finnish application.

* cited by examiner

*Primary Examiner* — Bob Phunkulh
(74) *Attorney, Agent, or Firm* — Young & Thompson

(57) ABSTRACT

The invention relates to transferring of a time of day value between network elements of a data transfer network. It has been surprisingly detected that the phase reference signals available to various network elements can be utilized in the synchronization of time of day values between these network elements. In the solution according to the invention, a first network element sends to a second network element a difference variable (401, 402, 403) that indicates how much the timing phase of the time of day value maintained in the first network element differs from the timing phase of the phase reference signal available to the first network element. In the second network element that receives the message, an estimate of the time of day value is formed (404, 405) based on the difference variable and the timing phase of the phase reference signal available to the second network element.

36 Claims, 5 Drawing Sheets

Figure 1:
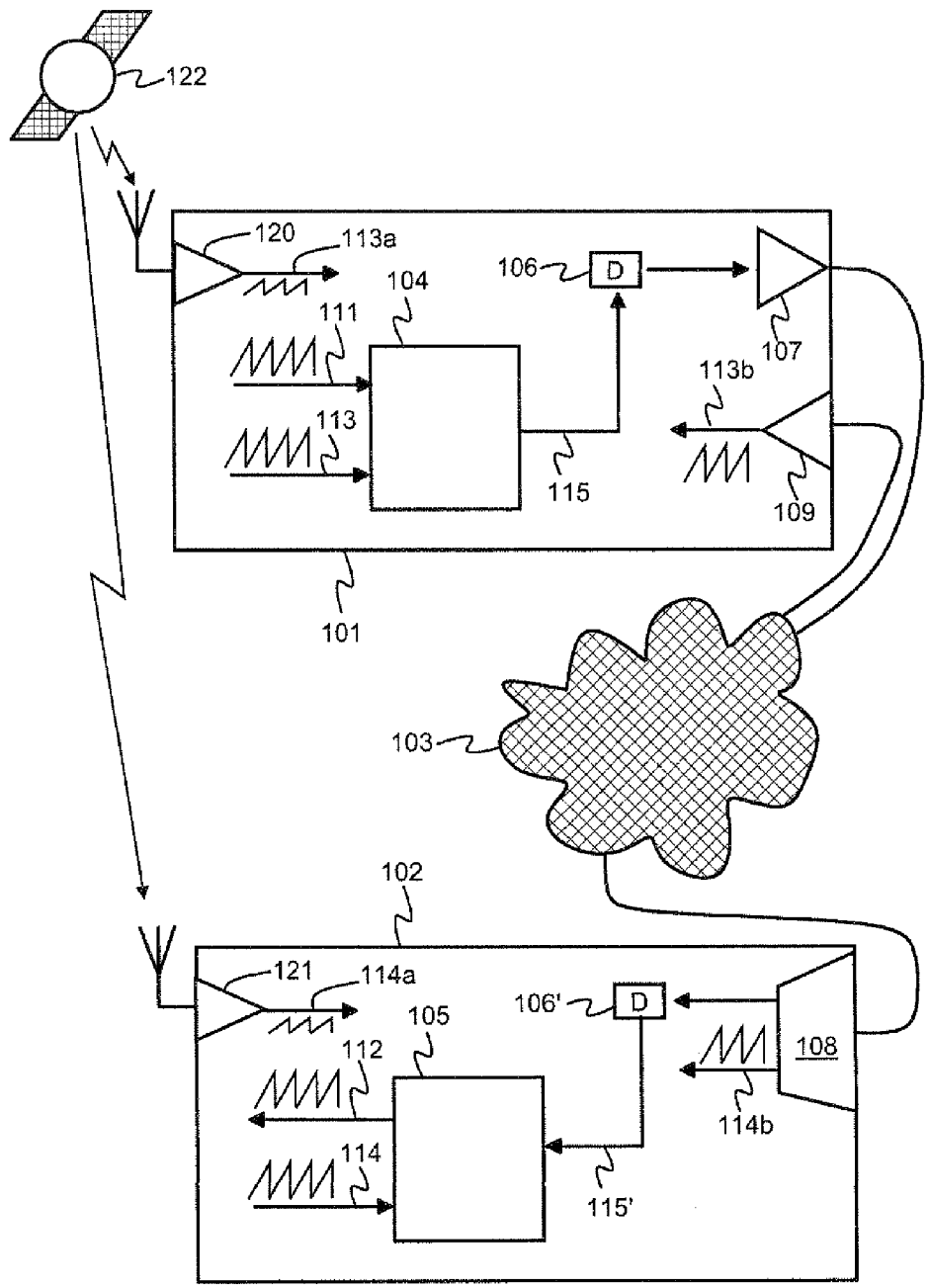

METHOD AND ARRANGEMENT FOR TRANSFERRING A TIME OF DAY VALUE BETWEEN NETWORK ELEMENTS

FIELD OF INVENTION

The invention relates to the synchronization of network elements of a data transfer network relative to each other. The object of the invention is a method and an arrangement for transferring a time of day value between network elements of a data transfer network. Another object of the invention is a network element and computer software.

BACKGROUND OF INVENTION

In many data transfer networks there is a need for synchronizing the time of day values maintained in the network elements in such a way that the time of day values of various network elements are equal to each other as accurately as possible. In other words, the time of day values maintained in various network elements should indicate a common time of day as accurately as possible. Said common time of day is generally referred to as universal wall clock time. Said network elements can be, for example, routers or base stations of a mobile telephone network. For example, in mobile telephone networks of the new generation, a prerequisite for the reliable data transfer between a mobile telephone moving from the service area of a base station to the service area of another base station and the base station network is that the base stations conform to a common time concept with a sufficient accuracy.

In one prior art solution, network elements send timestamp messages to each other, based on which each network element adjusts the time of day value it maintains. For illustrating the synchronization activity based on timestamps, two network elements A and B are examined. We assume that the network element A sends a timestamp message V1 to the network element B at a time when the time of day value of the network element A is t1. In other words, said timestamp message V1 includes the time of day value t1. The network element B receives said timestamp message V1 at a time when the time of day value of the network element B is t2. The difference t2−t1 includes two components, which are the difference of the time of day values Ds1 of the network elements A and B at the sending time of the timestamp message V1 and the transfer delay S1 of the timestamp message V1 from the network element A to the network element B. That is, t2−t1=Ds1+S1. In the above equation said transfer delay S1 is assumed to be indicated in the network element B as a change of the measured time of day. We assume that the network element B sends a timestamp message V2 to the network element A at a time when the time of day value of the network element B is t3. In other words, said timestamp message V2 includes the time of day value t3. The network element A receives said timestamp message V2 at a time when the time of day value of the network element A is t4. The difference t4−t3 includes two components, which are the difference of the time of day values Ds2 of the network elements B and A at the sending time of the timestamp message V2 and the transfer delay S2 of the timestamp message from the network element B to the network element A. That is, t4−t3=Ds2+S2. In the above equation said transfer delay S2 is assumed to be indicated in the network element A as a change of the measured time of day. In case the transfer delays S1 and S2 are mutually equal and the difference between the time of day values of the network elements A and B does not change between the sending times of the timestamp messages V1 and V2, the difference between the action steps can be calculated as follows:

$$Ds = \frac{(t2-t1)-(t4-t3)}{2}, \quad (1)$$

where Ds=Ds1=−Ds2. In case the time of day value t2 is sent from the network element B to the network element A, the network element A is capable of calculating, with Equation (1), how much the time of day value of the network element A differs from the time of day value of the network element B.

In packet-switched, frame-switched or cell-switched data transfer networks the above mentioned timestamp messages are transferred between various network elements as data packets, data frames of data cells. As described above, the calculation of the difference between time of day values using Equation (1) is based on assumptions that the difference between the time of day values of various network elements does not change between the sending times of the timestamp messages and that the transfer delays to various directions are mutually equal. Modern clockworks are generally of such a good quality that the assumption about the difference between the time of day values usually holds true very well. Instead in packet-switched, frame-switched and cell-switched data transfer networks, the assumption related to the transfer delay does not often hold true with a sufficient accuracy, since the transfer delay has a remarkable random-type portion and, in addition, data transfer paths between two network elements, routed to opposite transfer directions, can have a different length relative to each other. Said random-type portion is due to, for example, queue delays subjected to data packets, data frames or data cells in the transmission buffers and/or reception buffers.

SUMMARY OF INVENTION

In many data transfer systems, phase reference signals, which are phase locked relative to each other, are available to various network elements. These phase reference signals can be, for example, PPS (Pulse Per Second) signals or other corresponding signals received from a data transfer network, or PPS or other corresponding signals received from a satellite of the US Global Positioning System, the Russian GLONASS, or the European Galileo system. PPS or other corresponding signals can be transferred in a data transfer network, for example, by means of Ethernet Synchronization Status Messaging (SSM).

In connection with this invention it has been surprisingly detected that said phase reference signals available to various network elements can be utilized in the synchronization of time of day values between various network elements. In the solution according to the invention, network elements send each other messages that indicate how much the timing phase of the time of day maintained in the network element differs from the timing phase of the phase reference signal available to this network element. The network element receiving the message is capable of creating an estimate of said time of day value based on the information contained in said message and the timing phase of the phase reference signal available to said receiving network element.

An object of the invention is an arrangement for transferring a time of day value from a first network element to a second network element via a data communications network. A first phase reference signal is available to said first network element and a second phase reference signal, which is phase locked relative to said first phase reference signal, is available to said second network element. Said arrangement includes:

in said first network element, a first processor unit which is arranged to create a difference variable adapted to indicate the difference between the timing phases of said time of day value and said first phase reference signal and to write said difference variable in a data unit which is to be sent to said second network element, and in said second network element, a second processor unit which is arranged to read said difference variable from said data unit and to create an estimate of said time of day value based on said difference variable and the timing phase of said second phase reference signal.

Another object of the invention is a network element which is adapted to send a data unit defining a time of day value to a data communications network. Said network element includes a processor unit which is arranged to:

create a difference variable that is adapted to indicate the difference between the timing phases of said time of day value and the phase reference signal available to said network element, and write said difference variable in said data unit.

Another object of the invention is a network element which is adapted to receive a data unit defining a time of day value from a data communications network. Said network element includes a processor unit which is arranged to:

read the value comprised in said data unit, and create said time of day value based on the value read from said data unit and the timing phase of the phase reference signal available to said network element.

Still another object of the invention is a method for transferring a time of day value from a first network element to a second network element via a data communications network. A first phase reference signal is available to said first network element and a second phase reference signal, which is phase locked relative to said first phase reference signal, is available to said second network element. The following operations are performed in said method:

in said first network element, a difference variable is created which indicates the difference between the timing phases of said time of day value and said first phase reference signal, said difference variable is written in a data unit in said first network element, said data unit is transferred from said first network element to said second network element via said data communications network, said difference variable is read in said second network element from said data unit, and an estimate of said time of day value is created in said second network element based on said difference variable and said timing phase of said second phase reference signal.

Still another object of the invention is computer software for creating a data unit that defines a time of day value. Said computer software includes:

programmable means for controlling a programmable processor unit to create a difference variable that is adapted to indicate the difference between the timing phases of said time of day value and the phase reference signal available to said programmable processor unit, and programmable means for controlling said programmable processor unit to write said difference variable in said data unit.

Still another object of the invention is computer software for determining a time of day value. Said computer software includes:

programmable means for controlling a programmable processor unit to read the value contained in a data unit, and programmable means for controlling said programmable processor unit to create said time of day value based on the value read from said data unit and the timing phase of the phase reference signal available to said programmable processor unit.

With the embodiments of the invention, such an advantage is achieved compared to a prior art solution described in this document that the variation of the transfer delays of the difference variables indicating the difference between the timing phases of the time of day value and the phase reference signal does not decrease the quality of the synchronization of time of day values.

The various embodiments of the invention are characterized in what is stated in the dependent claims.

SHORT DESCRIPTION OF FIGURES

Figure 2A:
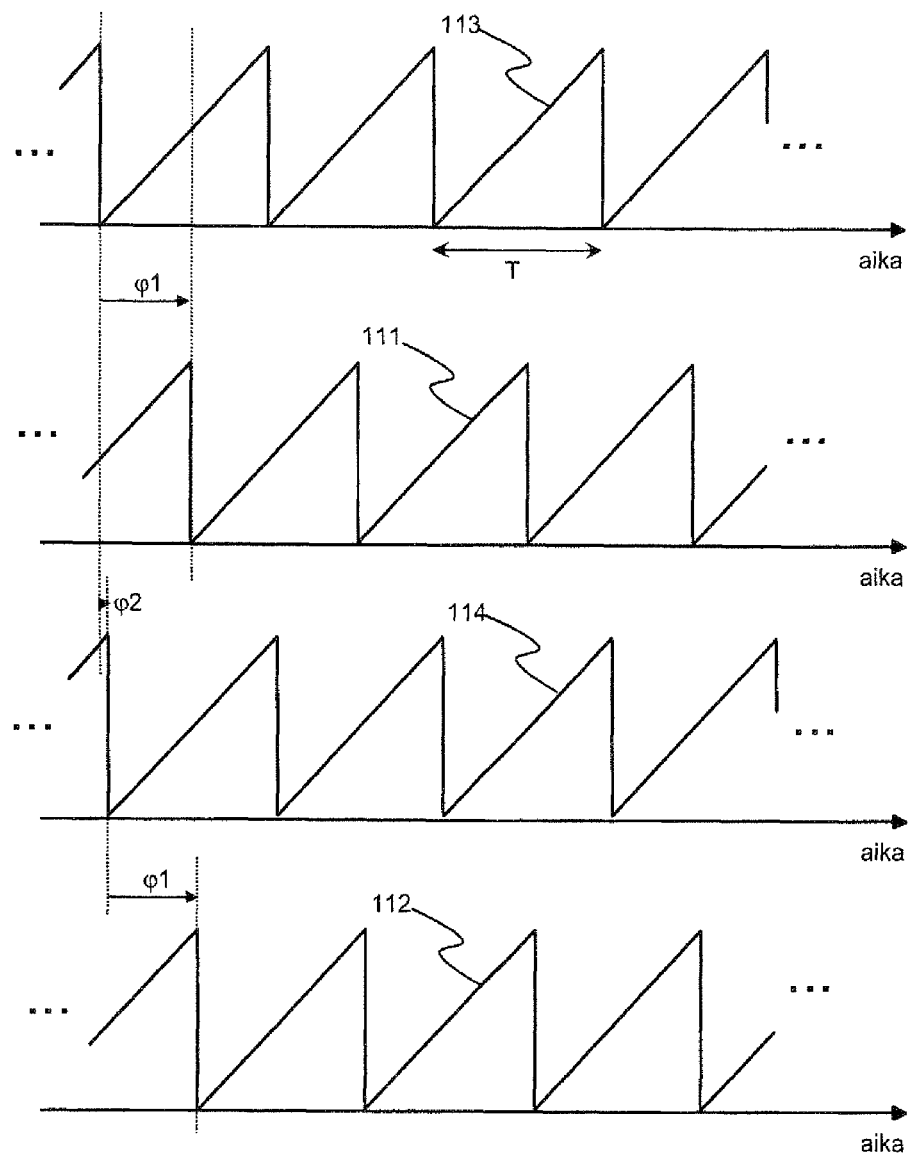
Figure 2B:
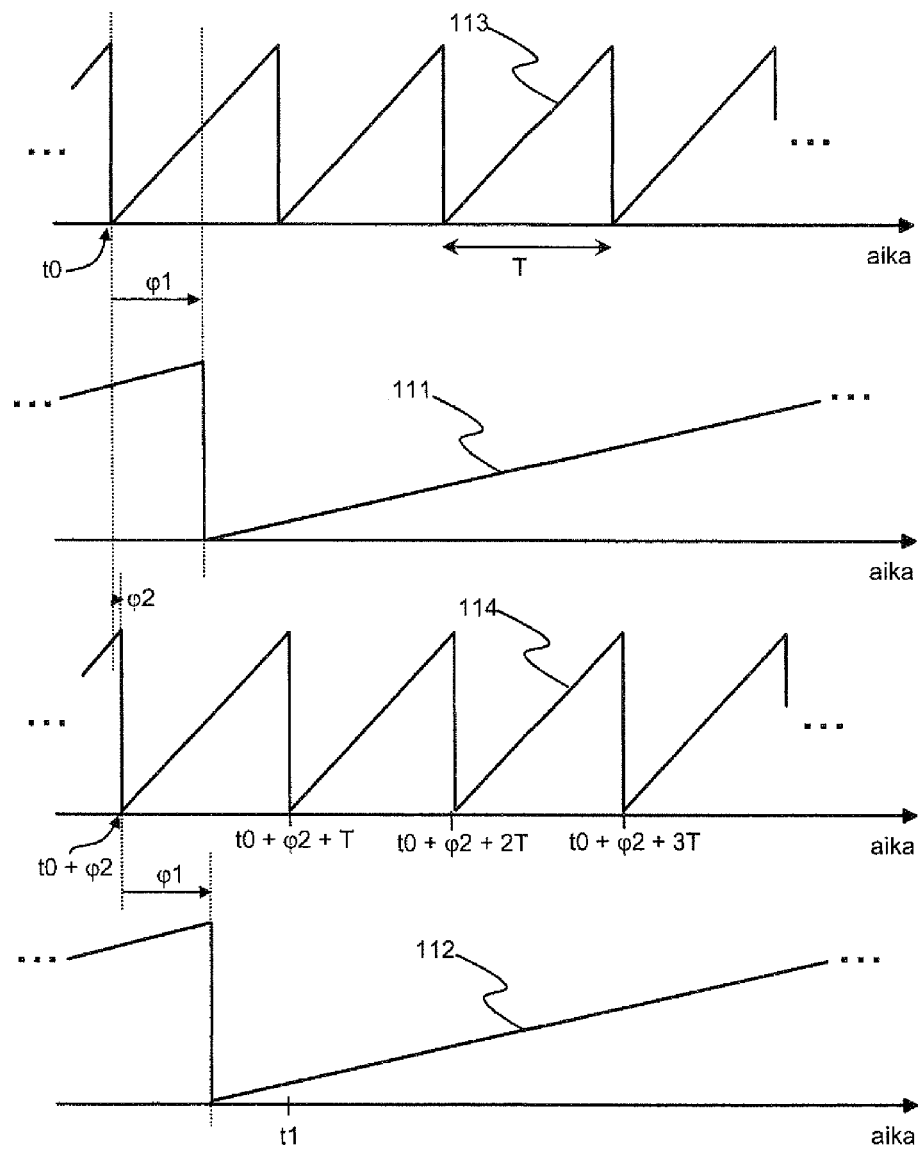
Figure 3:
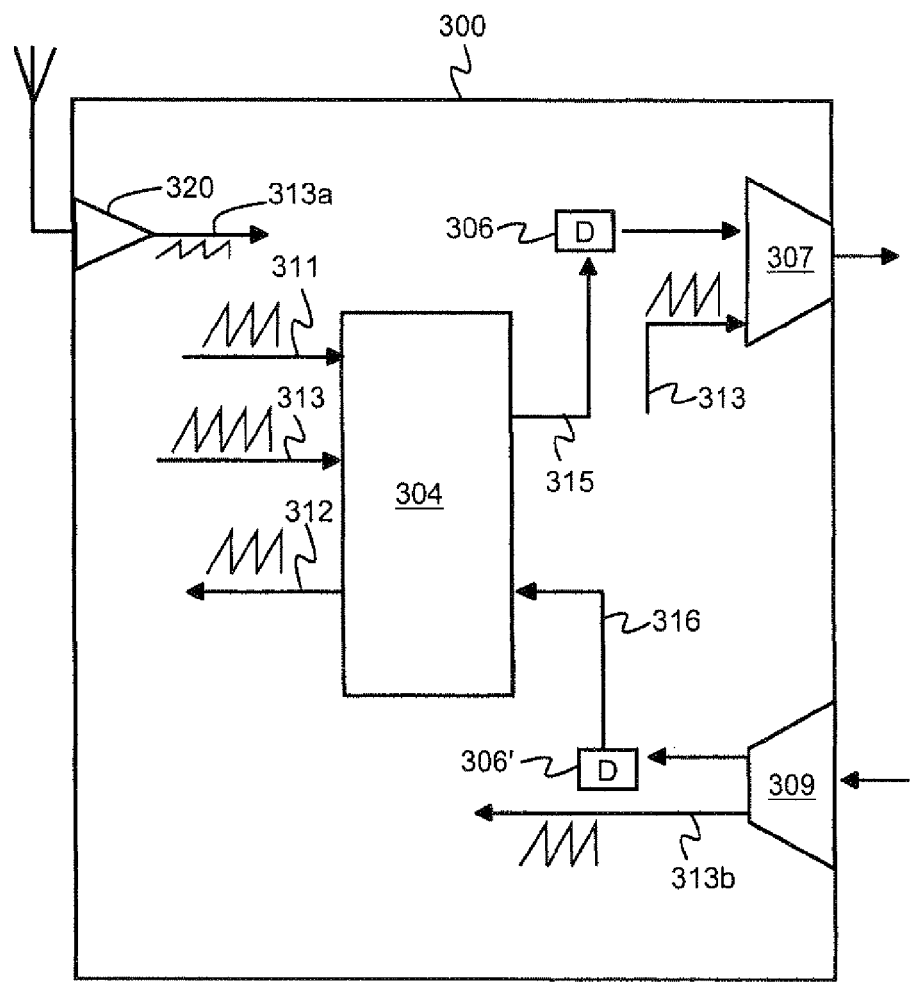
Figure 4:
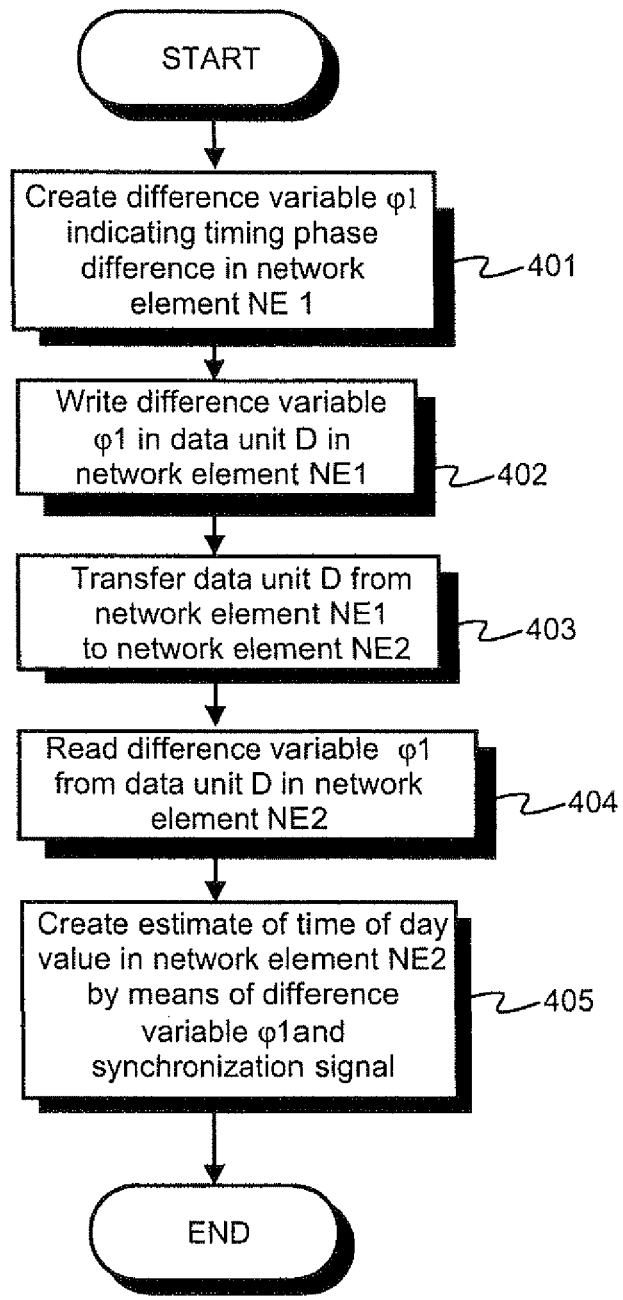

The embodiments of the invention together with advantages thereof are described below in more detail by making reference to exemplary embodiments and the appended figures in which:

FIG. 1 is a block diagram showing an example of a data communications system which includes an arrangement according to an embodiment of the invention for transferring a time of day value between network elements, FIG. 2a illustrates time of day values and phase reference signals available to network elements as functions of time in an exemplary situation in a data communications system according to FIG. 1, FIG. 2b illustrates time of day values and phase reference signals available to network elements as functions of time in a second exemplary situation in a data communications system according to FIG. 1, FIG. 3 is a block diagram showing a network element of a data communications network according to an embodiment of the invention, and FIG. 4 is a flow diagram showing a method according to one embodiment of the invention for transferring a time of day value between network elements.

DETAILED DESCRIPTION OF EMBODIMENTS OF INVENTION

FIG. 1 is a block diagram showing an example of a data communications system which includes an arrangement according to an embodiment of the invention for transferring a time of day value 111 from a first network element 101 to a second network element 102 via a data communications network. Said data communications network is represented by the crosshatched area 103 in FIG. 1. In its simplest form said data communications network 103 is a data transfer link connecting the network elements 101 and 102. A first phase reference signal 113 is available to the network element 101 and a second phase reference signal 114, which is phase locked relative to the phase reference signal 113, is available to the network element 102. The network element 101 includes a first processor unit 104 which is arranged to create a difference variable 115 that is adapted to indicate the difference between the timing phases of said time of day value 111 and the phase reference signal 113 and to write the difference variable 115 in a data unit 106 which is to be sent to the network element 102. The network element 101 includes a transmitter 107 for sending the data unit 106 to the network element 102. The network element 102 includes a receiver 108 for receiving the data unit 106 from the network element 101. In FIG. 1, the data unit 106 is represented by a data unit 106' after the data unit 106 has been transferred from the network element 101 to the network element 102. The network element 102 includes a second processor unit 105 which is arranged to read a difference variable 115' from the received data unit 106' and to create a time of day value 112 by means of the difference variable 115' and the timing phase of the phase reference signal 114. The time of day value 112 is an estimate of the time of day value 111. In FIG. 1 the difference variable 115' represents the difference variable 115 after the data unit 106 has been transferred from the network element 101 to the network element 102.

In an arrangement according to an embodiment of the invention, the data unit 106, 106' is a correction field of a synchronization message according to the IEEE1588v2 (Institute of Electrical and Electronics Engineers) protocol.

In an arrangement according to an embodiment of the invention, the data unit 106, 106' is one of the following: a part of a payload data field of an IP (Internet Protocol) package, and a payload data field of an ATM (Asynchronous Transfer Mode) cell.

In an arrangement according to an embodiment of the invention, the network element 101 is adapted to receive a phase reference signal 113a from a satellite 122, and the network element 102 is adapted to receive a phase reference signal 114a from said satellite 122. The processor unit 104 is adapted to use the phase reference signal 113a as the phase reference signal 113. Correspondingly, the processor unit 105 is adapted to use the phase reference signal 114a as the phase reference signal 114. The network element 101 includes a receiver 120 which is adapted to receive a phase reference signal sent by a satellite. Correspondingly, the network element 102 includes a receiver 121 which is adapted to receive a phase reference signal sent by a satellite. The phase reference signals 113a and 114a received from the satellite may have a mutual timing phase difference since the distances from the satellite 122 to the network elements 101 and 102 may differ relative to each other. However, this timing phase difference is generally so small that the error caused by it to the transfer of the time of day value is generally sufficiently small.

In an arrangement according to an embodiment of the invention, the network element 101 is adapted to receive the phase reference signal 113a from a data communications network 103 and the network element 102 is also adapted to receive the phase reference signal 114a from the data communications network 103. The processor unit 104 is adapted to use the phase reference signal 113b as the phase reference signal 113. Correspondingly, the processor unit 105 is adapted to use the phase reference signal 114b as the phase reference signal 114. The network element 101 includes a receiver 109 which is adapted to receive the phase reference signal 113b from a data communications network. The receiver 108 of the network element 102 is adapted to receive the phase reference signal 114b from a data communications network. The phase reference signals received from the data communications network 103 can be, for example, PPS Pulse Per Second) or other corresponding signals.

In an arrangement according to an embodiment of the invention, the network element 101 is arranged to send the phase reference signal 113 to the data communications network 103 and the network element 102 is arranged to receive the phase reference signal 113 from the data communications network. Thus the phase reference signal 113 received from the data communications network 103 represents the phase reference signal 114. The above described condition occurs, for example, when the network element 101 receives a phase reference signal, which can be, for example, a PPS signal, and distributes said phase reference signal via the data communications network to other network elements including the network element 102. The above described condition also occurs, for example, when the network element 101 generates a phase reference signal and distributes said phase reference signal via the data communications network to other network elements including the network element 102.

In an arrangement according to an embodiment of the invention, the network element 102 is arranged to send the phase reference signal 114 to the data communications network 103 and the network element 101 is arranged to receive the phase reference signal 114 from the data communications network. Thus the phase reference signal 114 received from the data communications network 103 represents the phase reference signal 113. What occurs in connection with the operation of the arrangement according to this embodiment of the invention is a condition in which phase reference information flows from the network element 102 to the network element 101 but the time of day value is transferred to the opposite direction from the network element 101 to the network element 102.

FIG. 2a illustrates the time of day values 111 and 112 as well as the phase reference signals 113 and 114 available to the network elements 101 and 102 as functions of time in an exemplary situation in the data communications system according to FIG. 1. In the exemplary situation shown in FIG. 2a, the time of day values 111 and 112 and the phase reference signals 113 and 114 are periodic quantities with a period length of T. In the example according to FIG. 2a, the value of the difference variable 115 (FIG. 1) is the difference $\phi 1$ between the timing phases of the time of day value 111 and the phase reference signal 113. The phase reference signals 113 and 114 have a timing phase difference $\phi 2$ due to non-ideality of the relative synchronization of the network elements 101 and 102. However, this timing phase difference $\phi 2$ is generally so small that the error caused by it to the transfer of the time of day value is generally sufficiently insignificant. The timing phase of the time of day value 112, which is an estimate of the time of day value 111, can be determined based on the timing phase of the phase reference signal 114 and the value $\phi 1$ of the difference variable 115. In the example shown in FIG. 2a, the timing phase of the time of day value 112 is the timing phase of the phase reference signal 114 delayed with the value $\phi 1$ of the difference variable 115.

FIG. 2b illustrates the time of day values 111 and 112 as well as the phase reference signals 113 and 114 available to the network elements 101 and 102 as functions of time in an exemplary situation in a data communications system according to FIG. 1. In the exemplary situation shown in FIG. 2b, the phase reference signals 113 and 114 are periodic quantities with a period length of T. The time of day values 111 and 112 are also periodic quantities but they have a greater period length than T. In the example according to FIG. 2b, the value of the difference variable 115 (FIG. 1) is the difference $\phi 1$ between the timing phases of the time of day value 111 and the phase reference signal 113. The phase reference signals 113 and 114 have a timing phase difference $\phi 2$ due to non-ideality of the relative synchronization of the network elements 101 and 102. The timing phase of the time of day value 112, which is an estimate of the time of day value 111, can be determined based on the timing phase of the phase reference signal 114 and the value $\phi 1$ of the difference variable 115. In the example shown in FIG. 2b, the timing phase of the time of day value 112 is the timing phase of the phase reference signal 114 delayed with the value φ1 of the difference variable 115.

In an arrangement according to an embodiment of the invention, the processor unit 105 of the network element 102 is arranged to determine that period of the phase reference signal 114 which corresponds to the difference variable 115, based on the following: 1) the point of time of receiving the difference variable 115, and 2) an estimate of the data transfer delay from the network element 101 to the network element 102. In the situation shown in FIG. 2b, this period of the phase reference signal 114 corresponds to the time interval $t0+\phi2 \leq t < t0+\phi2+T$, where t is time. We examine an exemplary situation in which the difference variable 115 is sent from the network element 101 at a time $t0+T/2$ and the estimate of said data transfer delay is DE. Then the estimate for the sending time of the difference variable 115 created in the network element 102 is $t0+T/2+d-DE$, where d is the actual data transfer delay. In case $DE-T/2+\phi2 \leq d < DE+T/2+\phi2$ is valid for the actual data transfer delay d, said sending time estimate is within a time interval $t0+\phi2 \leq t < t0+\phi2+T$, which represents the period of the phase reference signal 114 corresponding to the difference variable 115.

In an arrangement according to an embodiment of the invention, the processor unit 105 of the network element 102 is arranged to determine that period of the phase reference signal 114 which corresponds to the difference variable 115, using a prior art synchronization procedure based on timestamp messages. The network element 101 is adapted to perform said prior art synchronization procedure based on timestamp messages with the network element 102. An example of a synchronization procedure based on timestamp messages is given in this document in connection with the description of the background art. In this embodiment of the invention, the accuracy of the time of day value estimate created in the network element 102 with a synchronization procedure based on timestamp messages is improved by means of the difference variable 115 and the phase reference signal 114. A prior art synchronization procedure based on timestamp messages can be, for example, a synchronization procedure according to the IEEE1588v2 (Institute of Electrical and Electronics Engineers) protocol.

FIG. 3 is a block diagram showing a network element 300 of a data communications network according to an embodiment of the invention. The network element includes a transmitter 307 for sending data units to a data communications network and a receiver 309 for receiving data units from said data communications network. The network element shown in FIG. 3 can both send data units defining a time of day value and receive data units defining a time of day value. The network element includes a processor unit 304. In a situation where the network element 300 is configured to send data units defining a time of day value, the processor unit 304 is arranged to:

create a difference variable 315 that is adapted to indicate the difference between the timing phases of the time of day value 311 and the phase reference signal 313 available to the network element, and write the difference variable 315 to a data unit 306 which is to be sent to the data communications network.

The network element 300 according to an embodiment of the invention is arranged to perform a synchronization procedure based on timestamp messages with another network element when the network element 300 is configured to send data units that define a time of day value. Said synchronization procedure based on timestamp messages can be, for example, a synchronization procedure according to the IEEE1588v2 (Institute of Electrical and Electronics Engineers) protocol.

In a situation where the network element 300 is configured to receive data units defining a time of day value, the processor unit 304 is arranged to:

read the value 316 comprised in the data unit 306' received from the data communications network, and create an estimated time of day value 312 based on the value 316 and the timing phase of the phase reference signal 313.

In the network element 300 according to an embodiment of the invention, the processor unit 304 is arranged to determine that period of the phase reference signal 313 which corresponds to the value 316 read from a data unit 306', using a synchronization procedure based on timestamp messages. Said synchronization procedure based on timestamp messages can be, for example, a synchronization procedure according to the IEEE1588v2 (Institute of Electrical and Electronics Engineers) protocol.

The network element 300 can be, for example, an IP (Internet Protocol) router, an Ethernet switch, a base station of a mobile telephone network, or an MPLS (Multi Protocol Label Switching) switch.

In a network element according to an embodiment of the invention, the processor unit 304 is arranged to write a difference variable 315 in a correction field of a synchronization message of the IEEE1588v2 (Institute of Electrical and Electronics Engineers) protocol.

In a network element according to an embodiment of the invention, the processor unit 304 is arranged to read a value 316 from a correction field of a synchronization message of the IEEE1588v2 (Institute of Electrical and Electronics Engineers) protocol.

A network element according to an embodiment of the invention includes a receiver 320 which is arranged to receive a phase reference signal 313a from a satellite. The processor unit 304 is adapted to use the phase reference signal 313a as the phase reference signal 313.

In a network element according to an embodiment of the invention, the receiver 309 is arranged to receive the phase reference signal 313b from a data communications network. The processor unit 304 is adapted to use the phase reference signal 313b as the phase reference signal 313.

In a network element according to an embodiment of the invention, the transmitter 307 is arranged to send the phase reference signal 313 to a data communications network.

FIG. 4 is a flow diagram showing a method according to one embodiment of the invention for transferring a time of day value from a first network element NE1 to a second network element NE2 via a data communications network. In its simplest form said data communications network is a data transfer link connecting the network elements NE1 and NE2. A first phase reference signal is available to the network element NE1 and a second phase reference signal, which is phase locked relative to said first phase reference signal, is available to the network element NE2. In step 401, a difference variable φ1 is created which indicates the difference between the timing phases of said time of day value and said first phase reference signal. In step 402, said difference variable φ1 is written in a data unit D. In step 403, said data unit D is transferred from the network element NE1 to the network element NE2 via said data communications network. In step 404, the difference variable φ1 is read from said data unit D. In step 405, an estimate of the time of day value is created based on the difference variable φ1 and the timing phase of said second phase reference signal.

In a method according to an embodiment of the invention, said data unit D is a correction field of a synchronization message according to the IEEE1588v2 (Institute of Electrical and Electronics Engineers) protocol.

In a method according to an embodiment of the invention, said first phase reference signal is received from a satellite to the network element NE1 and said second phase reference signal is received from said satellite to the network element NE2.

In a method according to an embodiment of the invention, said first phase reference signal is received from said data communications network to the network element NE1 and said second phase reference signal is received from said data communications network to the network element NE2.

In a method according to an embodiment of the invention, said data unit D is one of the following: a part of a payload data field of an IP (Internet Protocol) package, and a payload data field of an ATM (Asynchronous Transfer Mode) cell.

In a method according to an embodiment of the invention, said first phase reference signal is sent from the network element NE1 to said data communications network and said first phase reference signal is received from said data communications network to the network element NE2. Then said second phase reference signal is said first phase reference signal received from said data communications network.

In a method according to an embodiment of the invention, that period of the phase reference signal which corresponds to said difference variable $\phi 1$ is determined in the network element NE2, using a synchronization procedure based on timestamp messages. Said synchronization procedure based on timestamp messages can be, for example, a synchronization procedure according to the IEEE1588v2 (Institute of Electrical and Electronics Engineers) protocol.

Computer software according to an embodiment of the invention for creating a data unit that defines a time of day value in a network element provided with a programmable processor unit, for a data communications network, includes the following programmable means:

programmable means for controlling said programmable processor unit to create a difference variable that is adapted to indicate the difference between the timing phases of said time of day value and the phase reference signal available to said network element, and programmable means for controlling said programmable processor unit to write said difference variable in said data unit.

In the computer software according to an embodiment of the invention, said data unit is a correction field of a synchronization message according to the IEEE1588v2 (Institute of Electrical and Electronics Engineers) protocol.

Computer software according to an embodiment of the invention for defining a time of day value in a network element provided with a programmable processor unit, for a data communications network, includes the following programmable means:

programmable means for controlling said programmable processor unit to read the value contained in a data unit received from said data communications network, and programmable means for controlling said programmable processor unit to create said time of day value based on the value read from said received data unit and the timing phase of the phase reference signal available to said network element.

Said programmable means can be, for example, subroutines or functions. For example, the processor unit 304 shown in FIG. 3 can be said programmable processor.

In the computer software according to an embodiment of the invention, said received data unit is a correction field of a synchronization message according to the IEEE1588v2 (Institute of Electrical and Electronics Engineers) protocol.

The computer software according to an embodiment of the invention is stored in a storage device, such as an optical disc (Compact Disk), which is readable to the programmable processor.

The computer software according to an embodiment of the invention is encoded in a signal which is receivable from a data communications network, for example, from Internet.

As is evident for those skilled in the art, the invention and its embodiments are not limited to the above described exemplary embodiments but the invention and its embodiments can be modified within the scope of the independent claim. References included in the claims that express the presence of characteristic features, for example "the arrangement includes a processor unit", are open in such a way that presenting characteristic features does not exclude a presence of other such characteristic features that are not presented in the independent or dependent claims.

The invention clamied is:

1. An arrangement for transferring a time of day value from a first network element to a second network element via a data communications network wherein a first phase reference signal is available to the first network element and a second phase reference signal, which is phase locked relative to said first phase reference signal, is available to the second network element, the arrangement including:

in said first network element, a first processor unit which is arranged to create a difference variable that is adapted to indicate the difference between the timing phases of said time of day value and said first phase reference signal and to write said difference variable in a data unit which is to be sent to said second network element, and in said second network element, a second processor unit which is arranged to read said difference variable from said data unit and to create an estimate of said time of day value based on said difference variable and the timing phase of said second phase reference signal.

2. An arrangement according to claim 1, wherein said data unit is a correction field of a synchronization message according to the IEEE1588v2 (Institute of Electrical and Electronics Engineers) protocol.

3. An arrangement according to claim 1, wherein said first network element is adapted to receive said first phase reference signal from a satellite and said second network element is adapted to receive said second phase reference signal from said satellite.

4. An arrangement according to claim 1, wherein said first network element is adapted to receive said first phase reference signal from said data communications network and said second network element is adapted to receive said second phase reference signal from said data communications network.

5. An arrangement according to claim 1, wherein said data unit is one of the following: a part of a payload data field of an IP (Internet Protocol) package, and a payload data field of an ATM (Asynchronous Transfer Mode) cell.

6. An arrangement according to claim 1, wherein said first network element is arranged to send said first phase reference signal to said data communications network and said second network element is arranged to receive said first phase reference signal from said data communications network, said second phase reference signal being said first phase reference signal received from said data communications network.

7. An arrangement according to claim 1, wherein said second processor unit is arranged to determine that period of said second phase reference signal which corresponds to said difference variable, using a synchronization procedure based on timestamp messages.

8. An arrangement according to claim 7, wherein said synchronization procedure based on timestamp messages is a synchronization procedure according to the IEEE1588v2 (Institute of Electrical and Electronics Engineers) protocol.

9. A network element adapted to send a data unit defining a time of day value to a data communications network, the network element including a processor unit which is arranged to:
   create a difference variable that is adapted to indicate the difference between the timing phases of said time of day value and the phase reference signal available to said network element, and
   write said difference variable in said data unit.

10. A network element according to claim 9, wherein said data unit is a correction field of a synchronization message according to the IEEE1588v2 (Institute of Electrical and Electronics Engineers) protocol.

11. A network element according to claim 9, wherein said processor unit is additionally arranged to:
   read the value comprised in the data unit received from said data communications network, and
   create an estimated time of day value based on the value read from said second data unit and the timing phase of said phase reference signal.

12. A network element according to claim 9, wherein said network element is arranged to receive said phase reference signal from a satellite.

13. A network element according to claim 9, wherein said network element is arranged to receive said phase reference signal from said data communications network.

14. A network element according to claim 9, wherein said network element is arranged to send said phase reference signal to said data communications network.

15. A network element according to claim 9, wherein the network element is one of the following: an IP (Internet Protocol) router, an Ethernet switch, a base station of a mobile telephone network, and an MPLS (Multi Protocol Label Switching) switch.

16. A network element according to claim 9, wherein said network element is arranged to perform a synchronization procedure based on timestamp messages with another network element.

17. A network element according to claim 16, wherein said synchronization procedure based on timestamp messages is a synchronization procedure according to the IEEE1588v2 (Institute of Electrical and Electronics Engineers) protocol.

18. A network element adapted to receive a data unit defining a time of day value from a data communications network, the network element including a processor unit which is arranged to:
   read the value comprised in said data unit, and
   create said time of day value based on the value read from said data unit and the timing phase of the phase reference signal available to said network element.

19. A network element according to claim 18, wherein said data unit is a correction field of a synchronization message according to the IEEE1588v2 (Institute of Electrical and Electronics Engineers) protocol.

20. A network element according to claim 18, wherein said network element is arranged to receive said phase reference signal from a satellite.

21. A network element according to claim 18, wherein said network element is arranged to receive said phase reference signal from said data communications network.

22. A network element according to claim 18, wherein the network element is one of the following: an IP (Internet Protocol) router, an Ethernet switch, a base station of a mobile telephone network, and an MPLS (Multi Protocol Label Switching) switch.

23. A network element according to claim 18, wherein said processor unit is arranged to determine that period of said phase reference signal which corresponds to the value read from said data unit, using a synchronization procedure based on timestamp messages.

24. A network element according to claim 23, wherein said synchronization procedure based on timestamp messages is a synchronization procedure according to the IEEE1588v2 (Institute of Electrical and Electronics Engineers) protocol.

25. A method for transferring a time of day value from a first network element to a second network element via a data communications network, wherein a first phase reference signal is available to the first network element and a second phase reference signal, which is phase locked relative to said first phase reference signal, is available to the second network element, the method comprising:
   creating, in said first network element, a difference variable indicating the difference between the timing phases of said time of day value and said first phase reference signal,
   writing said difference variable in a data unit in said first network element,
   transferring said data unit from said first network element to said second network element via said data communications network,
   reading said difference variable in said second network element from said data unit, and
   creating an estimate of said time of day value in said second network element based on said difference variable and the timing phase of said second phase reference signal.

26. A method according to claim 25, wherein said data unit is a correction field of a synchronization message according to the IEEE1588v2 (Institute of Electrical and Electronics Engineers) protocol.

27. A method according to claim 25, wherein in said first network element, said first phase reference signal is received from a satellite, and in said second network element, said second phase reference signal is received from said satellite.

28. A method according to claim 25, wherein in said first network element, said first phase reference signal is received from said data communications network, and in said second network element, said second phase reference signal is received from said data communication network.

29. A method according to claim 25, wherein said data unit is one of the following: a part of a payload data field of an IP (Internet Protocol) package, and a payload data field of an ATM (Asynchronous Transfer Mode) cell.

30. A method according to claim 25, wherein said first phase reference signal is sent from said first network element to said data communications network and said first phase reference signal is received from said data communications network to said second network element, said second phase reference signal being said first phase reference signal received from said data communications network.

31. A method according to claim 25, wherein that period of said phase reference signal which corresponds to said difference variable, is determined in said second network element using a synchronization procedure based on timestamp messages.

32. A method according to claim 31, wherein said synchronization procedure based on timestamp messages is a synchronization procedure according to the IEEE1588v2 (Institute of Electrical and Electronics Engineers) protocol.

33. A non-transitory computer readable medium encoded with a computer program when executed on a computer causes the computer to operate for creating a data unit that defines a time of day value, the computer program including:
- programmable means for controlling a programmable processor unit to create a difference variable that is adapted to indicate the difference between the timing phases of said time of day value and the phase reference signal available to said programmable processor unit, and
- programmable means for controlling said programmable processor unit to write said difference variable in said data unit.

34. A non-transitory computer readable medium according to claim 33, wherein the computer program further includes:
- programmable means for controlling said programmable processor unit to read the value contained in a second data unit, and
- programmable means for controlling said programmable processor unit to create an estimated time of day value based on the value read from said second data unit and the timing phase of said phase reference signal.

35. A non-transitory computer readable medium according to claim 33, wherein said data unit is a correction field of a synchronization message according to the IEEE1588v2 (Institute of Electrical and Electronics Engineers) protocol.

36. A non-transitory computer readable medium according to claim 34, wherein said second data unit is a correction field of a synchronization message according to the IEEE1588v2 (Institute of Electrical and Electronics Engineers) protocol.

* * * * *